United States Patent [19]
Furon et al.

[11] 3,828,609
[45] Aug. 13, 1974

[54] TUBE INSPECTION SYSTEM WITH INTERLACED SCANNING

[75] Inventors: Leon D. Furon, Woodland Hills; John A. Robinson, Chatsworth, both of Calif.; Jack E. Menick, Wilmington, N.C.

[73] Assignee: Automation Industries, Inc., Los Angeles, Calif.; by said Furon and Robinson

[22] Filed: Sept. 5, 1972

[21] Appl. No.: 286,150

[52] U.S. Cl............................. 73/67.8 S, 73/71.5 U
[51] Int. Cl. ............................................ G01n 29/04
[58] Field of Search............ 73/67.8 R, 67.8 S, 67.9, 73/71.5 U, 67.7

[56] References Cited
UNITED STATES PATENTS

| | | | |
|---|---|---|---|
| 3,183,709 | 5/1965 | Rankin et al. | 73/67.9 X |
| 3,228,233 | 1/1966 | Keldenich | 73/67.8 S |
| 3,354,700 | 11/1967 | Schindler | 73/67.9 |
| 3,373,602 | 3/1968 | Wendt et al. | 73/67.9 X |
| 3,375,706 | 4/1968 | Pandelis et al. | 73/67.9 |
| 3,472,064 | 10/1969 | Kortenhoven | 73/67.8 S |
| 3,554,014 | 1/1971 | Berg | 73/67.8 |
| 3,557,610 | 1/1971 | Wilson | 73/67.5 R |
| 3,593,569 | 7/1971 | Wilson | 73/67.7 |
| 3,603,136 | 9/1971 | Diamond | 73/67.8 R |
| 3,636,778 | 1/1972 | Huffstetler | 73/67.8 R |

OTHER PUBLICATIONS

Rooney et al., Ultrasonic Inspection of Small Diameter Thin–Wall Tubing, Ultrasonics, April 1966, p. 57–63.
Whittington et al., Electronic Steering & Focusing of Ultrasonic Beams in Tube Inspection, Ultrasonics, Jan. 1969, p. 20–25.

*Primary Examiner*—Richard C. Queisser
*Assistant Examiner*—John P. Beauchamp
*Attorney, Agent, or Firm*—Dan R. Sadler

[57] ABSTRACT

An ultrasonic nondestructive testing system is disclosed herein for inspecting elongated workpieces such as tubing at high rates of speed by means of an interlaced scanning system. The interlaced scanning system insures the entire volume of the workpiece being scanned at a variety of different angles and in a plurality of different overlapping and interlaced scan patterns whereby a high speed inspection of the entire volume of the workpiece is possible.

3 Claims, 13 Drawing Figures

3,828,609

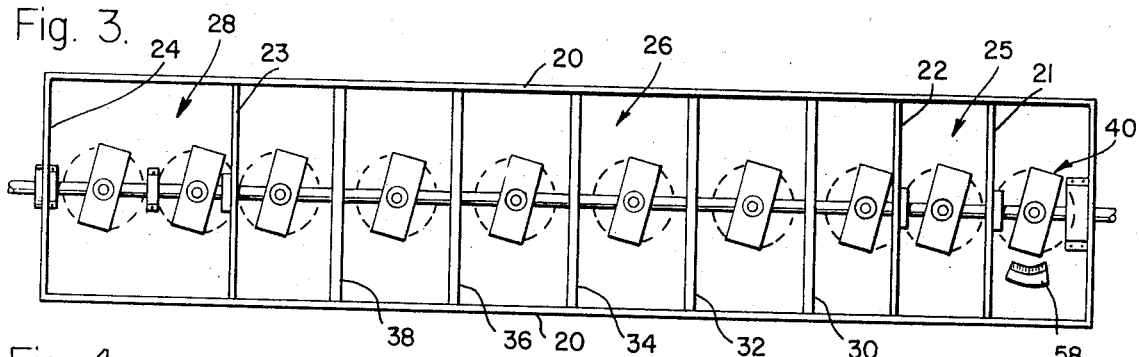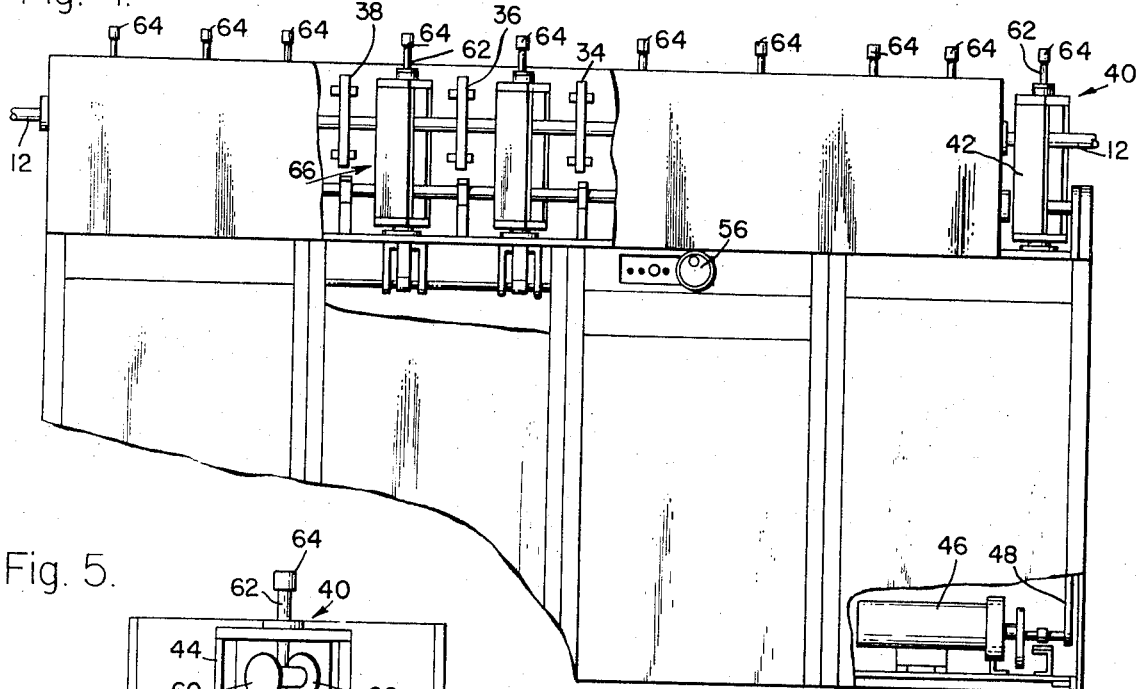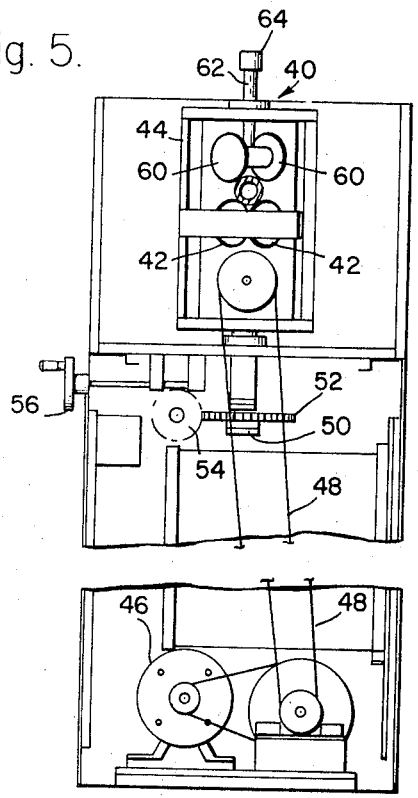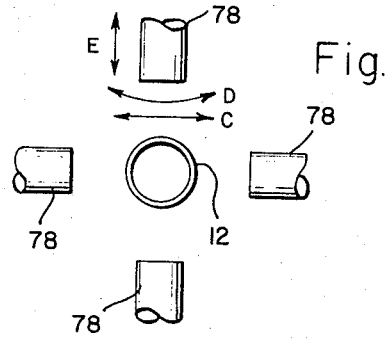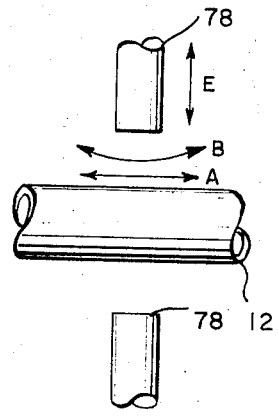

TUBE INSPECTION SYSTEM WITH INTERLACED SCANNING

BACKGROUND

It is frequently desirable to inspect various material, objects, etc., for any hidden defects. The completeness and accuracy of the inspection are dependent to a considerable extent upon the intended use for the object. If the failure of a part is not particularly dangerous nor costly to repair, an exhaustive and expensive inspection is not necessary.

However, under some circumstances the failure of a part may be very dangerous and/or may result in very costly reparis. Such hazards require that a very careful, complete and reliable inspection be made whereby all defects of every description are identified. For example, the fuel cell in a nuclear reactor normally includes a large number of tubes formed into a "bundle." Each of the individual tubes contains the radioactive fuel; e.g., enriched uranium. If any particular one of these tubes fails there is an extremely high probability that a substantial amount of radioactive material will be released into the environment. This is, of course, a hazard which must be avoided.

In addition, in order to make any repairs to the fuel cell, the reactor must be taken out of service and dismantled. As a consequence, such a failure necessitates very expensive repairs. It will thus be seen that under such circumstances it is highly desirable to very carefully and thoroughly inspect all of the tubes for a fuel cell to be sure they are completely free from any and all defects of any sort. There are, of course, many other situations where a similar high degree of care must be exercised.

Heretofore, in order to insepct a workpiece such as a tube of this nature it has been customary to use ultrasonic nondestructive testing systems. In such a system a search unit scans the workpiece while it transmits ultrasonic energy into the workpiece and receives echoes therefrom. The workpiece is usually simultaneously rotated and moved axially past the search unit whereby a helical path is scanned.

In order to detect very small defects it has been necessary to employ a search unit having a very narrow beam width. If the width of the beam is excessive, very small defects cannot be found. If a complete inspection of 100% of the material in the workpiece is required, the workpiece must not be advanced axially during each revolution by a distance which is more than the width of the beam. Because of the limited beam width, the resultant pitch of the helical scan path has inherently been very small. This in turn has required a long time to inspect the tube. Therefore, although it has been possible to make a complete inspection, such an inspection has been very costly and time consuming.

SUMMARY

The present invention provides means for overcoming the foregoing difficulties. More particularly, it is proposed to provide an ultrasonic inspection system which will ensure a complete inspection of 100 percent of the volume of a workpiece such as a tube at a high rate of speed.

In the embodiment disclosed herein this is accomplished by providing an inspection system having several inspection stations through which the workpiece travels. Each inspection station includes a group or array of search units. The search units in each array are positioned around the workpiece whereby their individual scan paths are always interlaced with each other.

The individual search units are so arranged that irrespective of their angular adjustments their respective beams each scan separate paths which are always properly interlaced with the other whereby the entire volume of the workpiece is thoroughly inspected.

As a result of the unique interlacing of the scan paths, the workpiece may be advanced through the inspection stations a greater distance during each revolution thereof. This in turn permits the inspection to be made at a much higher rate of speed.

DRAWINGS

FIG. 3 is a plan vieww of the immersion tank used in the system of FIG. 1 and embodying a series of individual inspection stations therein;

FIG. 4 is a front-elevational view of the immersion tank of FIG. 3 and its supporting stand;

FIG. 5 is an end view of the immersion tank and its supporting stand of FIG. 4;

FIGS. 7A and 7B are diagrammatic views of the array of the search units in the insepction station of FIG. 6 and showing how the search units and their scan patterns can be adjusted by the search unit manipulator of FIG. 2;

DESCRIPTION

Figure 1:
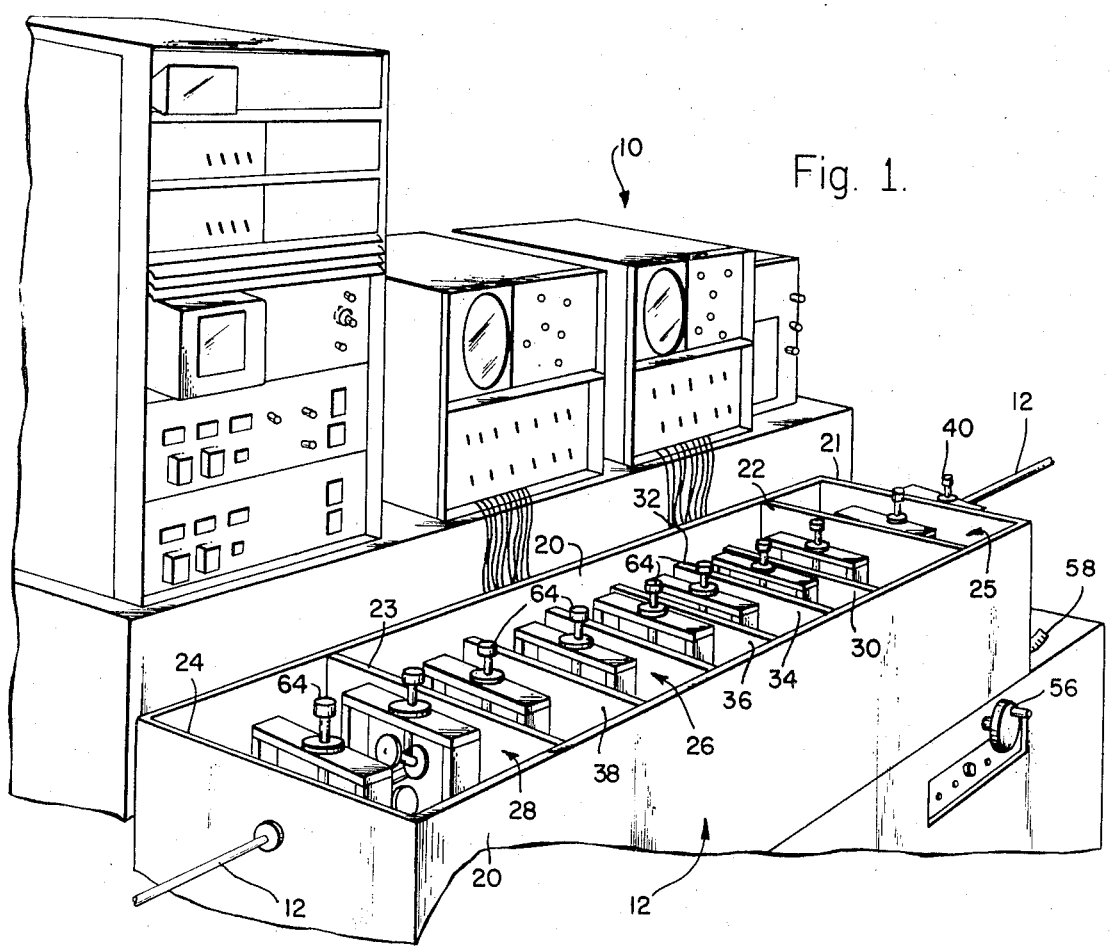
FIG. 1 is a perspective view of a nondestructive testing system embodying one form of the present invention and particularly adapted for inspecting workpieces such as tubes.

The present invention is particularly adapted to be embodied in an ultrasonic nondestructive testing system 10. Although this system 10 may be used for inspecting a wide variety of different types of workpieces, for illustrative purposes it is shown inspecting workpieces such as long, slender tubes 12.

The present system includes an immersion tank 14 through which the workpiece 12 passes as it is being inspected. The immersion tank 14 is seated upon a horizontal platform 16 formed by the top of a supporting stand 18.

The tank 14 includes a pair of vertical side walls 20 and a plurality of transverse bulkheads 21, 22 and 23. The bulkheads 21, 22 and 23 divide the tank into a plurality of separate compartments 25, 26 and 28. A plurality of ultrasonic inspection stations 30, 32, 34, 35 and 36 is provided in the central compartment 26. Each of these stations is adapted to perform an ultrasonic inspection of the tube 12 as it passes therethrough.

The two center bulkheads 22 and 23 which define the opposite ends of a central compartment 26 are effective to keep the compartment filled with an ultrasonic couplant such as water. Aligned openings are provided in each of the bulkheads whereby an elongated workpiece such as the tube 12 may pass axially therethrough.

The level of the liquid couplant is normally higher than the openings in the bulkheads. It is therefore desirable to provide some form of a seal around the tube 12 to limit the loss of the liquid couplant. The seal may be in the form of a resilient rubber gland, etc., which contracts and wipes along the tube 12 as it passes therethrough.

However, it has been found that under some circumstances it is desirable to avoid any sliding contact on the tube 12. Under these conditions an insert may be placed in the enlarged opening through the bulkhead. This insert has a passage therethrough which is just slightly larger than the exterior of the tube 12 being tested. This arrangement leaves a small clearance space around the tube 12 whereby there is no sliding contact against the tube 12. However, a certain amount of the liquid couplant is permitted to escape through the clearance space.

The intermediate bulkheads 22 and 23 and the end bulkheads 21 and 24 define end or collection compartments 25 and 28. These compartments 25 and 28 act as sumps into which the escaping couplant flows and is collected. A pump recirculates the couplant from the collection compartments 25 and 28 back into the center compartment 26. It will thus be seen that although the tube 12 is always submerged in the liquid couplant it is never contacted by any sliding engagement.

A tube drive 40 is provided for advancing the tube 12 through the immersion tank 14. In the present instance the drive 40 is effective to move the tube 12 axially through the tank 14 and to rotate it at the same time. As a consequence, a point on the surface of the tube 12 will travel along a helical path.

Although any suitable drive 40 may be employed, in the present instance a pair of rollers 42 is mounted on a cross brace on a vertical frame 44. The rollers 42 are positioned adjacent each other whereby the tube 12 rests on the two rollers 42. A variable speed electric motor 46 is coupled to the rollers 42 by an endless belt 48 for running them at any desired speed. It can be appreciated that with the tube 12 resting on the rollers 42 as they rotate, the tube 12 will also rotate.

The frame 44 is mounted on a rotatable shaft 50. The shaft 50 extends vertically through the platform 16 and has a gear 52 on the lower end thereof. This gear 52 meshes with a worm 54 driven by a manually manipulated crank 56 on the front of the stand 18. By rotating the crank 56, the shaft 50 and the frame 44 thereon moves the rollers 42 about the axis of the shaft. When the rollers 42 are oblique to the tube 12 their rotation causes the tube 12 to move axially as it rotates.

The amount of axial movement of the tube 12 (i.e., the pitch of the helix) is a function of the angle of the rollers 42. An indicator 58 may be provided on the frame 44 whereby the angle of the rollers 42 and therefore the pitch can be readily determined by the operator as he manipulates the crank 56.

It has been found desirable to provide a pair of idler rollers 60 to assist in holding the tube 12 firmly in position on the drive rollers 42. In the present instance the idler rollers 60 which are mounted on a spindle 62 projecting through the top of the fame 44 bear upon the top of the tube 12. Since the idler rollers 60 are on the opposite side from the drive rollers 42, they are "cocked" at an equal but opposite angle to that of the drive rollers 42. In the present instance the upper end of each spindle 62 includes a knob 64 for rotating the spindle 62 and the rollers 60 carried thereby. Whenever the drive rollers 42 are adjusted the knob 64 is turned to match the angle of the idler rollers 60 with the angle of the drive rollers 42.

The foregoing arrangement is effective to rotate and axially advance the tube 12. However, it has been found that with the single drive 40 of this nature there is a possibility of the drive slipping and/or marring the surface of the tube 12. Also, if the drive rollers 42 do not adequately support the tube 12 it may tend to "whip" as it is rotated.

To avoid these difficulties it has been found desirable to provide a plurality of additional drives 66 in the tank 14 so as to support the tube 12 at several points spaced along its length. Each of these drives 66 is similar to the preceding one and includes a fame mounted on the end of a vertical shaft. Each shaft includes a gear which meshes with a worm controlled by the front-panel crank 56. When the crank 56 is manipulated it will cause all of the frames to synchronously rotate about their vertical axes. A pair of drive wheels is mounted on each frame to support and drive that portion of the tube. Each pair of drive wheels is driven by the belt drive 48 from the electric motor 46. This will cause all of the wheels to rotate in synchronism and produce uniform amounts of axial movement.

In addition, a pair of idler rollers may be provided on each of the frames to engage the top of the tube 12 whereby the tube 12 is held in engagement with the drive wheels. Each pair of idler rollers is carried by a spindle 62 which extends through the top of the frame and has a knob 64 thereon. These knobs 64 are adjusted to position each pair of idler rollers at exactly equal but opposite angles to the angle for the bottom or drive rollers.

Each of the inspection stations 30, 32, 34, 36 and 38 includes a vertical plate 68 which is disposed transversely within the tank 42. Preferably each of the plates is disposed between a pair of the tube drives 66 whereby the tube 12 is securely retained in position as it enters and leaves each of the inspection stations 30 to 38. As a consequence, the tube 12 is always maintained in precise axial alignment as it passes through each of the inspection stations 30 to 38.

Each of the vertical plates 68 includes an opening 70 through which the tube 12 may pass as it traverses the inspection station. A plurality or array 72 of ultrasonic search units 74 is provided at each inspection station. The search units 74 are each individually mounted on the plate 68 by manipulators 76 disposed at various positions around the opening 70. Each of the search units 74 includes a transducer 78 for directing ultrasonic energy into the tube 12 as it passes therethrough and receiving echoes of the energy returning from the tube 12.

Figure 2:
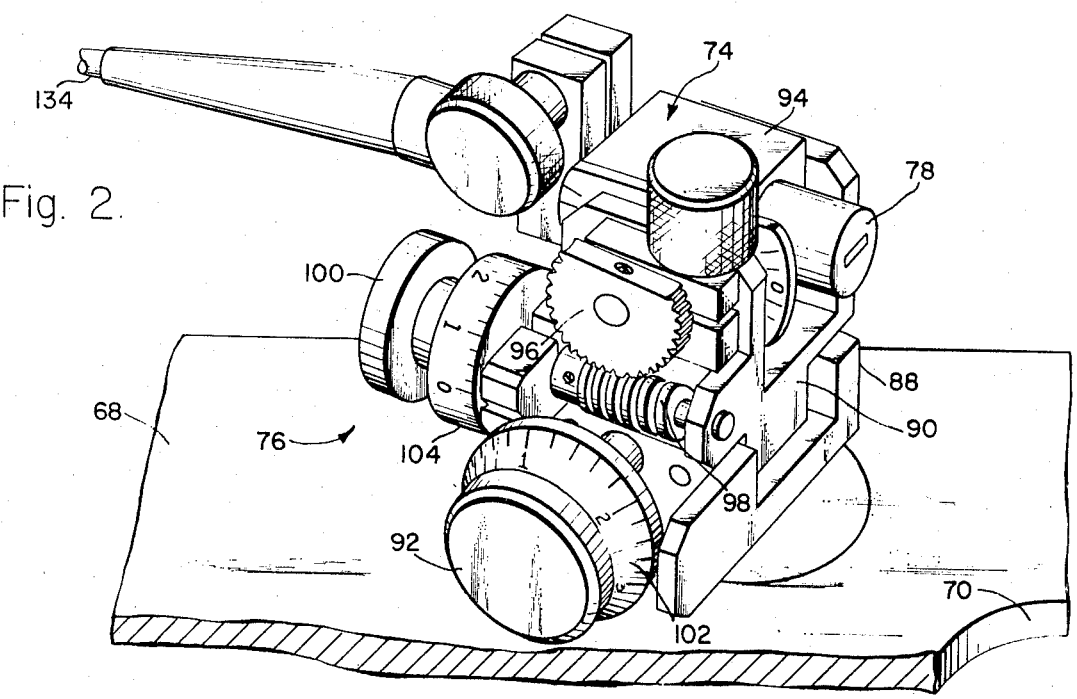
FIG. 2 is a perspective view of one of the search units and its associated manipulator utilized in the system of FIG. 1.
Figure 6:
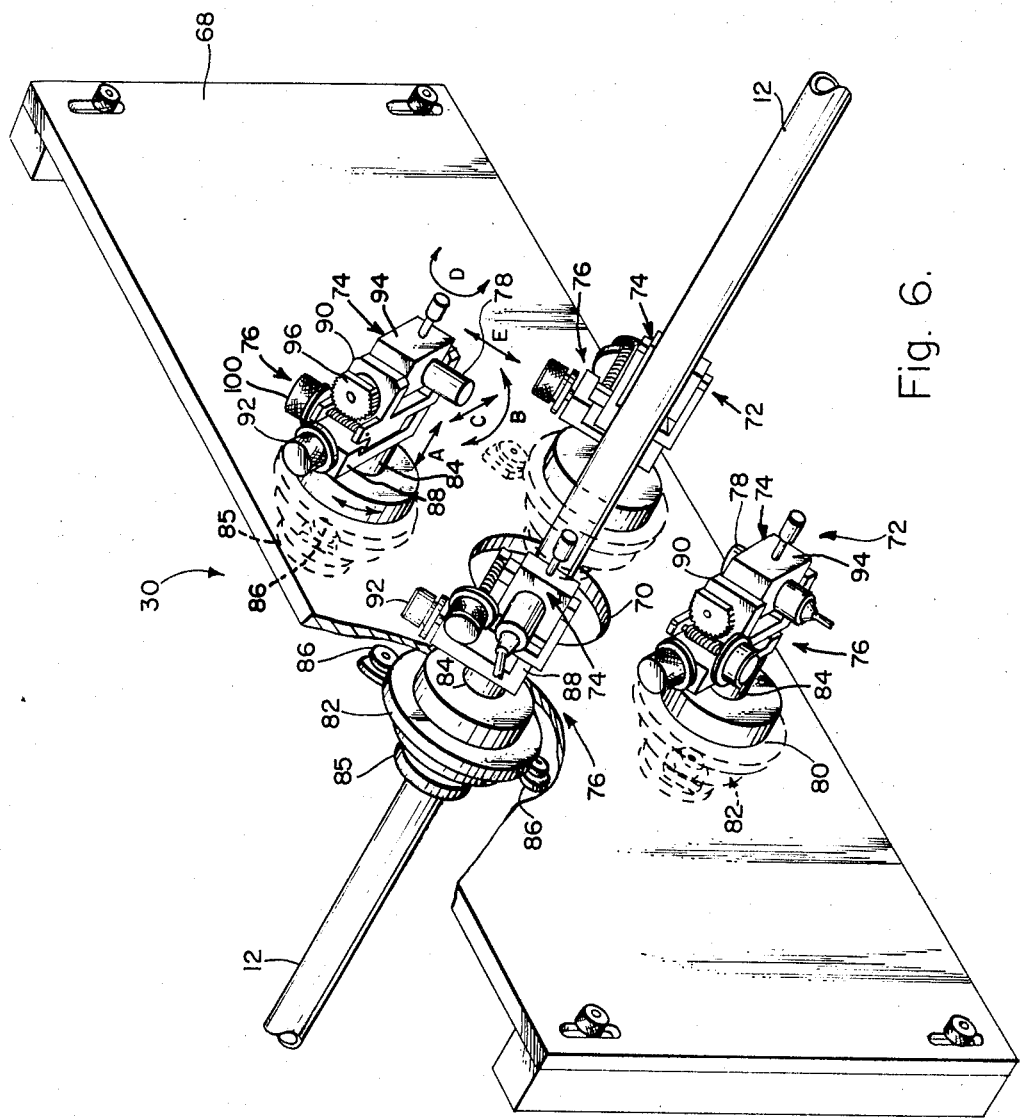
FIG. 6 is a perspective view of one of the inspection stations within the immersion tank of FIG. 3 and having an array of search units for inspecting a workpiece such as a tube.

Each of the manipulators 76 is substantially identical to or at least very similar to that shown in FIGS. 2 and 6. Each of the manipulators 76 is effective to adjust the position of the search unit 74. The number of adjustments and their nature is to some degree dependent upon the nature of the workpiece, the nature of the tests, etc. However, each of the manipulators 76 is effective to provide an adequate number of adjustments to properly position the search unit 74 relative to the tube 12 whereby the ultrasonic energy is incident upon the surface of the tube 12 at the desired location and at the desired angle.

As indicated above the exact number, variety, etc., of adjustments may vary from system to system. However, by way of example, in the present embodiment each manipulator 76 permits five separate and independent adjustments A, B, C, D and E to be made. The nature of the adjustments can best be seen in FIG. 6, 7A and 7B.

Each of the manipulators 76 is mounted on a support 80 attached to the plate 68. The support 80 includes a hub 82 disposed on one side of the plate 68. A shaft 84 extends from the hub 82 and through the plate 68. The manipulator 76 is mounted on the end of the shaft 84. A knob 85 extends axially from the hub 82 and includes a set of screw threads. Rotating this knob 85 moves the shaft 84 and searach unit 74 in a direction A normal to the plate 68 and parallel to the axis of the tube 12.

A second control 86 is provided on the plate 68. It meshes with the hub 82 whereby the control 86 is effective to rotate the hub 82 and shaft 84. This allows swinging the search unit 74 in according to adjustment D (i.e., in a plane which is parallel to the plate 68 and normal to the axis of the tube 12).

These two adjustments A and D permit moving each of the search units 74 (1) by rotating them in direction D parallel to the plane of the plate 68 whereby the beams of ultrasonic energy therefrom are aligned with a radius passing through the center of the tube 12; and (2) in direction A normal to the plate 68 and parallel to the tube 12 whereby all of the beams are incident upon the tube 12 in a single, common plane. These two adjustments A and D are so-called "set-up" adjustments. They are made at the time the manipulator 76 and search unit 74 are installed. They are then locked and normally seldom, if ever, re-adjusted.

In addition the manipulator 76 includes a first yoke 88 mounted on the end of the shaft 84. This yoke 88 moves axially and rotatably with the shaft 84 (i.e., A and D). A second yoke 90 is mounted on the first yoke 88. The second yoke 90 is adapted to slide across the first yoke 88. A control knob 92 on the first yoke 88 operates a screw whereby an operator may move the second yoke 90 across the first yoke 88. This provides an adjustment C of the search unit 74 in a lateral direction, i.e., transverse to the tube 12.

The search unit 74 includes a holder 94 and a transducer 78. The holder 94 is gimbaled on the second yoke 90. A worm wheel or section gear 96 on the side of the holder 94 meshes with a worm 98 on the second yoke 90. The worm 96 is in turn controlled by the knob 100. Rotating the knob 100 rocks the search unit 74 about the axis of the sector gear 96. The transducer 78 is mounted in a passage extending through the holder 94. The transducer 78 is responsive to an electrical driving signal and is effective to transmit ultrasonic energy along predetermined beams. Conversely, the transducer 78 is adapted to generate an electrical signal in response to ultrasonic energy returning along the beam and incident upon the transducer 78.

By adjusting the knob 100 the search unit 74 is rotated in direction B and the angle of the beam of ultrasonic energy relative to the tube 12 is varied.

The transducer 78 may be moved in direction E axially of the passage in the holder 94. This moves the transducer 78 toward and away from the tube 12. Varying the distance between the transducer 78 and the tube 12 in this manner provides an adjustable time delay for receiving any returning echoes from the tube 12.

In summary it will be seen the transducer 78 in the search unit 74 may be moved in five separate directions A, B, C, D and E. The first two, A and D, are the "set-up" adjustments made by manipulating the knobs 85 and 86. These adjustments insure all of the search units 74 in an inspection station being initially positioned with their beams in a common plane normal to the axis of the tube 12 and aligned with a radius of the tube (i.e., aimed at the axis of the tube).

The next pair of adjustments is made by manipulating the two knobs 92 and 100. These adjustments move the search unit 74 laterally C of the tube 12 and angularly B of the tube 12. The amounts of the adjustments are indicated by the readings on the dials 102 and 104. The final adjustment is made by releasing the transducer 78 whereby it may be moved through the holder 94 to vary the length of the coupling path between the transducer and the tube.

It can be appreciated that as the tube 12 traverses the immersion tank 14 it will simultaneously move axially and rotate. As it successively passes through each of the inspection stations 30, 32, 34, 36 and 38, each one of the search units 74 in the inspection stations will scan the tube 12; i.e., each of the beams will be incident upon the tube 12 along a scan path. Because of the combined axial and rotational movement, the scan path is a helix. As explained in detail subsequently by employing a plurality of search units, a plurality of scan paths are provided. By properly adjusting the search units in each group, all of the scan paths for that group can be interlaced with each other whereby a full and complete inspection is insured for each group of search units or inspection station. Also, each of the individual scan paths within the group may be arranged with its opposite edges partially overlaying the edges of the two adjacent scan paths. In addition to the scan paths in each group being interlaced with each other and partially overlapping each other, the scan paths from the various groups will overlap and interlace with the scan paths from the other groups. As a consequence, it is possible to completely scan the entire volume of the workpiece in a plurality of different overlapping and interlaced scan patterns.

Figure 9:
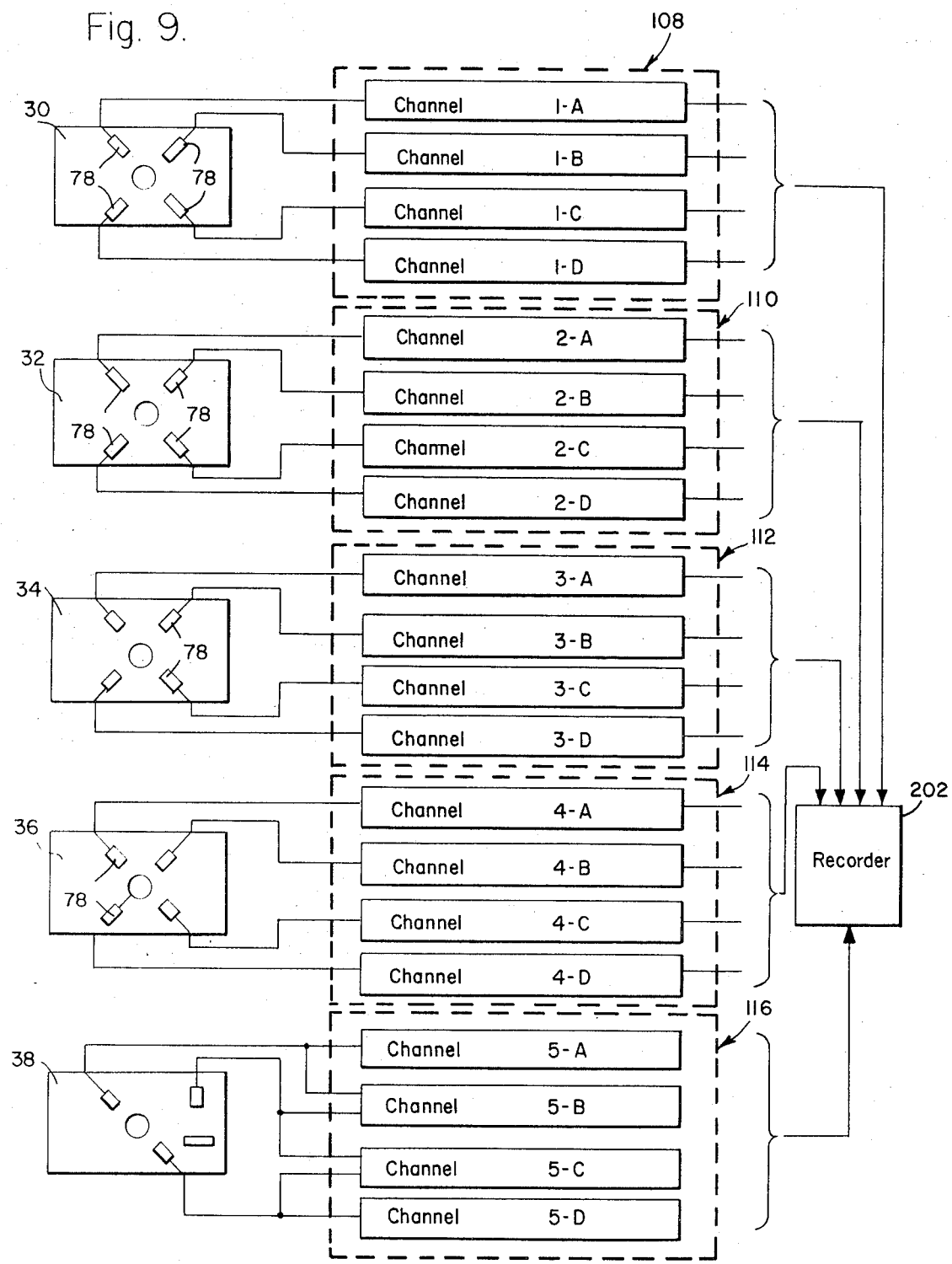
FIG. 9 is a block diagram of the inspection system.

The electronic portion of the system 10 is best seen in FIG. 9. The system 10 includes a separate module 108, 110, 112, 114 and 116 or section for each of the inspection stations 30, 32, 34, 36 and 38, respectively. The exact details of the modules and particularly their adjustments are dependent to some degree upon the details of the respective inspection station and the nature of the inspection being made at that inspection station.

The structures of the first four inspection stations 30, 32, 34 and 36 are essentially identical although the adjustments, etc., of the search units 74 in the different stations may be materially different from each other. Accordingly, the first four modules 108, 110, 112 and 114 are essentially the same. Although the fifth inspection station 38 may be essentially identical to the first four stations, in the present instance it is shown as somewhat different. The fifth module 116 differs somewhat from the other modules to reflect the differences in the inspection station.

Each of the modules 108, 110, 112 and 114 include four separate channels 118, 120, 122 and 124; i.e., one for each of the search units 74 in the associated inspection station. In the present embodiment each of these four channels operates in a so-called pulse/echo mode (i.e., it periodically transmits a pulse of ultrasonic energy and then receives any echoes that may be returned).

Figure 10:
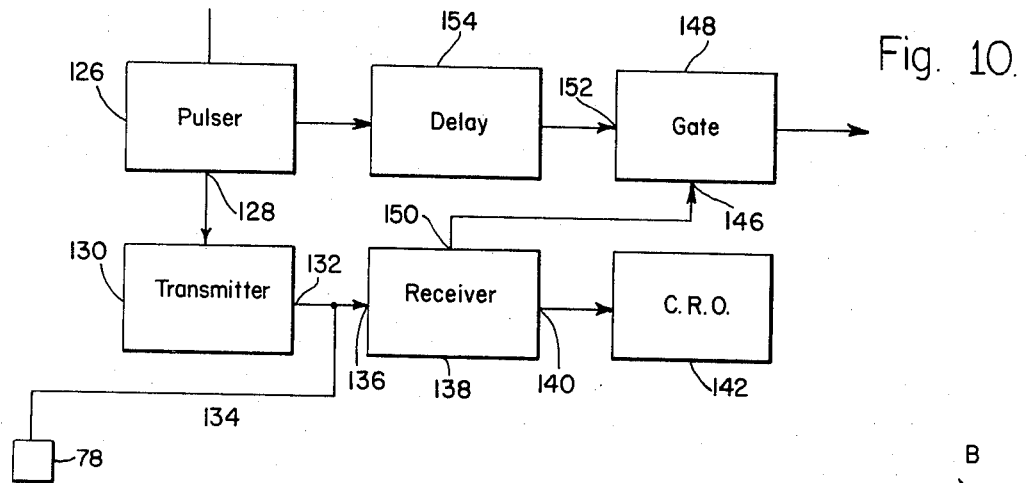
FIG. 10 is a block diagram of one portion of the inspection system of FIG. 9 associated with the inspection station of FIG. 6.

Each and every one of the channels, or at least those in the first four modules, may be substantially identical to that shown in FIG. 10. The channel includes a pulser 126 which produces a series of timing or clock pulses. The clock pulses determine the repetition rate at which the entire channel operates. The frequency of the repetition rate is not believed to be particularly critical and by way of example may be in a range on the order of 1 or 2 kilocycles.

The pulser 126 may be of any suitable design. It may be of the so-called free running variety. However, under some circumstances it has been found desirable to synchronize the operation of all the pulsers in the system 10 or at least all those pulsers which are in a single module. In this event the separate pulsers may be interconnected to function together or else a single pulser may be provided for all of the channels.

One output 128 of the pulser 126 is coupled to the input of a transmitter 130. The transmitter 130 is responsive to the clock pulses and produces a driving pulse in synchronism therewith. The driving pulse is suitable for activating the transducer 78 and causing it to radiate a pulse of ultrasonic energy along its beam pattern. This pulse of ultrasonic energy is sometimes referred to as the "main bang."

The output 132 of the transmitter 130 is connected to a transmission line such as a coaxial cable 134. The cable 134 in turn is coupled to a transducer 78 in a respective one of the search units 74 in the inspection station. Thus each time the pulser 126 generates a clock pulse, the transmitter 130 causes the search unit 74 to radiate a pulse of ultrasonic energy. In the event any echoes return to the search unit 74, a corresponding electrical signal is produced and applied to the coaxial cable 134.

The input 136 of a receiver 138 is coupled to the coaxial cable 134 whereby the signals generated by the search unit 74 (i.e., the signals corresponding to echoes incident upon the search unit) are fed to the receiver 138. It should be noted that with an arrangement of this nature the output 132 of the transmitter 130 is coupled directly to the input 136 of the receiver 138. As a consequence the driving signal, The "main bang" signal, etc., are coupled directly into the receiver 138.

These signals are usually several magnitudes greater than the echo signals. Such a signal is considerably beyond the dynamic range of a receiver which is sensitive enough to receive the echo signals. Accordingly, the receiiver 138 is usually "blocked" or "swamped" for an interval of time following the occurrence of the "main bang." Also, if any echoes return before the ultrasonic energy in the "main bang" has dissipated, it will be obscured or lost.

To avoid difficulties of this nature the position of the transducer 78 may be adjusted in the direction E to increase its distance from the tube 12. This will increase the time required for the first echo to return to the search unit 74. This time delay is made long enough to allow the receiver 138 to fully recover before the first echo of significance is received.

If a pulse of ultrasonic energy is incident upon the surface of a workpiece, a portion of the energy is reflected from the surface back to the search unit 74. However, a substantial portion of the energy is also coupled into the workpiece.

The energy entering the workpiece travels therethrough and is reflected from any discontinuity such as the surfaces of the workpiece and/or any cracks, voids, inclusions, etc. At least a portion of these echoes is reflected back to the search unit 74. The search unit 74 then produces a signal which corresponds to the nature of the discontinuity. More particularly, the amplitude of the signal is a function of the size of the discontinuity (or at least its effectiveness as a reflector) and its timing is a function of the distance or range to the discontinuity.

One output 140 of the receiver 138 may be coupled to indicating means such as a cathode ray oscilloscope 142. The oscilloscope 142 may be connected to the pulser 126 whereby its operation will be synchronized with the transmissions of the ultrasonic pulses and the reception of any echoes thereof.

This arrangement will permit the operator to visually observe the testing and its results. This will be of great assistance in "setting up" the equipment for the testing function. Normally, the oscilloscope 142 is not always being used. Therefore, in the interest of economy, it has been found that only one or two oscilloscopes may be provided. A switching arrangement can then be provided to allow the operator to switch the oscilloscope 142 from one channel to the next and thereby observe how the channels are functioning.

In the present instance, the presence of any defects (i.e., cracks, etc.) in the wall 144 of the tube 12 is of primary interest. Any echoes returning from within the wall 144 of the tube 12 occur at a predictable time. Accordingly, the signal input 146 of a gate 148 may be coupled to the output 150 of the receiver 138. The control input 152 for the gate 148 is coupled to the pulser 126 by means of a delay 154.

This delay is effective to "OPEN" the gate 148 only after the lapse of a period of time corresponding to the distance through the workpiece containing the volume of material being inspected.

At all other times the gate 148 remains "CLOSED." As a consequence, the only time a signal from the receiver 138 will pass through the gate 148 is when an echo is reflected from a discontinuity such as a crack situated within the wall 144 of the tube 12.

The output of the gate 148 is connected to suitable utilizing means such as an alarm and/or a recorder 156, etc. In the event there is a defect present in the wall 144 of the tube 12, the alarm will be activated and/or a recording made. This will then permit the operator to make a determination as to the nature of the defect and whether the tube 12 should be rejected.

The exact nature of the system, the number of channels, etc., depends to a considerable extent on the nature of the workpiece and the defects which may be present therein. When ultrasonic energy is incident upon a reflecting surface, the energy is reflected at an angle equal to the angle of incidence.

Therefore, if a defect, such as a crack, is in a plane normal to the ultrasonic energy, an echo of maximum strength will return. Conversely, if the crack is in a plane parallel to the direction of the beam, there will be very little, if any, echo returned. Accordingly, if a complete and reliable test or inspection is required, the workpiece should be scanned from a plurality of different directions. Thus, irrespective of the orientation of a crack it will be scanned by at least one beam at an angle insuring a large echo.

Figures 8A, 8B:
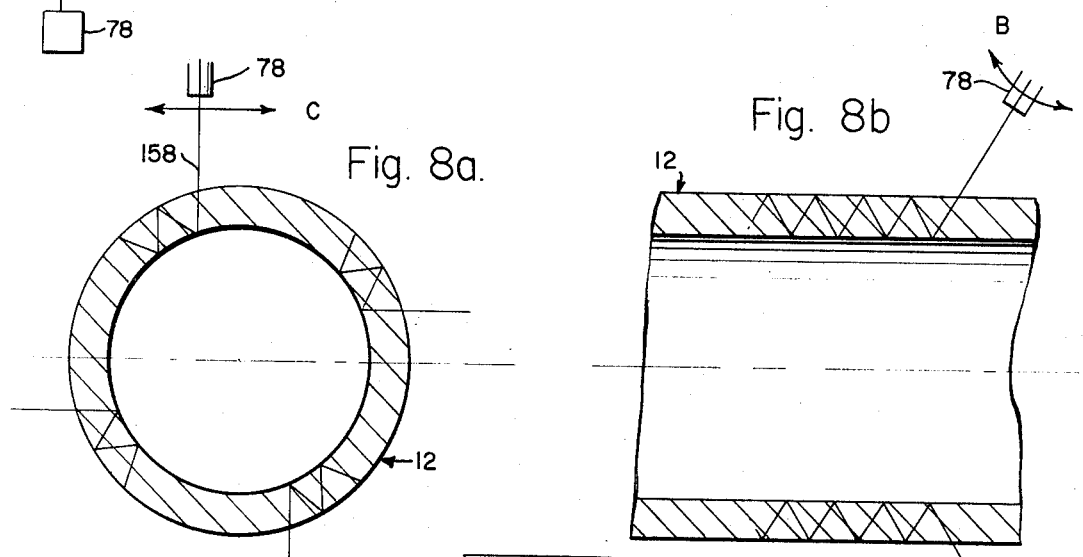
FIGS. 8A and 8B are transverse, longitudinal, crosssectional views, on an enlarged scale, of portions of a tubular workpiece showing the interlacing of the scan patterns as produced by the adjustments illustrated in FIGS. 7A and 7B.

As may be seen from FIG. 8A, in the present instance, each of the transducers 78 in one inspection station is laterally displaced by adjustment C (for example to the left) from its original radially aligned position. This will cause the beam 158 to travel parallel to the radial and be incident upon the exterior of the wall 144 at a slightly displaced point. A substantial portion of this energy will enter into the wall 144 and propagate therethrough.

After the ultrasonic energy has traversed the wall 140 it is incident upon the inside of the tube 12 at a slightly oblique angle. This energy is then reflected at an angle whereby it strikes the outside of the tube 12 at a point displaced from the initial point of incidence. The energy will thus be reflected in a zig-zag pattern around the wall of the tube in a counter-clockwise pattern. The angle of the zig-zag is a function of the amount of displacement in direction C.

The diameter of the beam 158 is normally selected to be on the same order of magnitude as the smallest defect of interest. This insures even the smallest defect having a major effect upon the beam 158. The geometry of the zig-zag pattern is arranged such that the repeatedly reflected beam will have little or no space therebetween. This insures a complete scanning of the entire volume of the material.

In the event a defect such as a crack is present as the tube 12 rotates and advances axially, at some point at least some portion of the beam 158 will be incident upon the crack. If the orientation of the crack is proper, an echo will be reflected back to the search unit 74 and a corresponding signal will be produced. The interval during which the gate 148 is "OPEN" is set to correspond to the time such an echo will be received. Usually this will include several zig-zags. All four of the search units 74 in the inspection station are laterally offset in the same direction and by the same amount. As a result each of the search units 74 in the station scans the wall 144 of the tube 12 in an identical fashion. However, the scan paths followed by the four separate beams are all interlaced with each other and also slightly overlap each other whereby they completely scan the entire volume of the tube from a particular angle and direction.

All four of the search units 74 in another inspection station are usually laterally offset in the direction C by the same amounts but in the opposite way. As a consequence, the beams 158 of ultrasonic energy at this inspection station travel in a second, substantially identical zig-zag pattern around the tube but in the opposite or clockwise direction.

By such an arrangement these two inspection stations insure the wall of the tube being completely scanned circumferentially in two opposite directions. Thus, if there is a longitudinal crack at least one of the search units in one or both of these inspection stations will detect the presence of the crack.

In both of the foregoing stations the beams are propagating in circumferential or transverse directions. As a result they are primarily sensitive to cracks oriented in the longitudinal direction and least sensitive to cracks, etc., running in a transverse direction.

In order to insure detection of any transverse cracks, the wall 144 of the tube 12 may be inspected in both of the longitudinal directions. As best seen in FIG. 8B, all four of the search units in one inspection station are rotated in the direction B. The search units are thereby inclined at an angle whereby the beam 158 enters the wall 144 at an oblique angle. The energy will thus follow a zig-zag pattern as it is repeatedly reflected between the opposite sides of the wall. This pattern extends longitudinally of the tube 12 in a forward direction.

Conversely, all of the search units in another station are rotated in direction B whereby they are adjusted at an equal but opposite angle. This will cause the search units in the other station to direct their beams 158 longitudinally of the tube but in the opposite direction.

Figure 11:
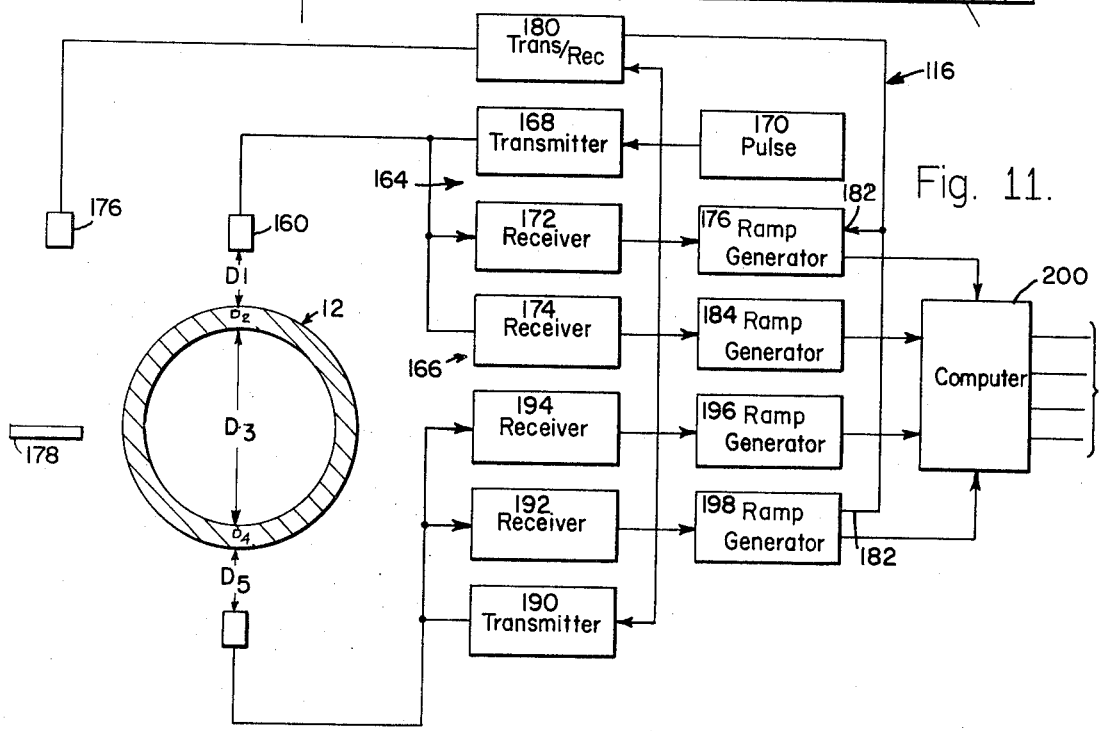
FIG. 11 is a block diagram of another portion of the inspection system of FIG. 9 and a diagrammatic view associated therewith.

It may be seen that the foregoing inspection stations are effective to scan the tube in both circumferential directions and in both longitudinal directions whereby any defects such as cracks, voids, inclusions, etc., are detected irrespective of their orientation. Usually these are the only defects which are of concern. However, if there is a possibility of defects of other types being present, additional inspection stations may be provided to inspect the tube for such other types of defects. For example, it may be desirable to inspect the tube for such things as the thickness of the wall, the inside diameter of the tube and/or the amount of ovality, essentricities, etc. In the present instance the last inspection station 38 and the module 116 as shown in FIG. 11 and associated therewith are particularly adapted for detecting such irregularities. However, it should be borne in mind that it may be arranged to locate any desired type of defect.

The inspection station 38 includes a pair of search units 160 and 162 which is substantially identical to those in the preceding stations. The search units 160 and 162 are disposed on diametrically opposite sides of the tube 12 and in alignment with each other.

The two search units 160 and 162 are separated by a constant, predetermined distance C. This distance C which remains constant may be subdivided into several separate parts $D_1$, $D_2$, $D_3$, $D_4$ and $D_5$. The first part $D_1$ includes the water path extending from the search unit 160 to the interface between the liquid couplant and the front of the tube 12. This part has a length which may tend to vary somewhat if the tube moves up and down while it is traveling through the station. The second part $D_2$ includes the first wall of the tube. The length of this part is the thickness of the wall and it will tend to vary as the thickness of the wall varies. The third part $D_3$ is the passage formed inside the tube. The length $D_3$ is equal to the inside diameter of tube and will tned to vary as the dimensions of the tube vary. The fourth part $D_4$ includes the second or opposite wall of the tube. This dimension $D_4$ will also vary as the thickness of the tube varies. The last part $D_5$ is the water path from the tube to the second search unit 162. The length $D_5$ of of this part varies if the tube moves up and down.

The first search unit 160 is connected to a pair of channels 164 and 166. These channels 164 and 166 include a transmitter 168 for driving the search unit 160 and causing it to transmit the ultrasonic energy. The transmitter 168 is triggered by a pulser 170 which operates periodically.

Each of the channels 164 and 166 includes its own separate receiver 172 and 174. Both of the receivers 172 and 174 are coupled to the search unit 160. Both of the receivers 172 and 174 are thus effective to receive the various signals generated by the search unit 160. The receivers 172 and 174 are each effective to produce a series of pulses corresponding to the envelope of the signals from the search unit.

The first pulse from the receivers 172 and 174 corresponds to the "main bang" or the time when the pulse of ultrasonic energy is radiated from the search unit 160. The second pulse corresponds to the first echo reflected from the exterior of the tube 12. This pulse corresponds to the interface between the water couplant and the tube and is frequently referred to as the interface pulse. The third pulse corresponds to the echo from the inside surface of the tube 12. Although there may be additional pulses, they are of no interest and are greatly delayed in time. It should be noted that since the interior of the tube is full of air, there will be virtually no ultrasonic energy coupled diametrically across the inside of the tube 12.

It may be seen that the time between the first pulse and the second pulse corresponds to the length $D_1$ of the water path between the search unit 16 and the exterior of the tube 12. Moreover, the time between the second pulse and the third pulse corresponds to the thickness $D_2$ of the wall.

The first receiver 172 is coupled to a ramp or sawtooth generator 176. This generator 176 is of a conventional design and is effective to produce a so-called sawtooth wave form. More particularly, it produces a wave form having an amplitude which increases as a linear function of time. The ramp generator 176 is triggered by the first pulse and is stopped by the second pulse.

When the second pulse occurs the potential on the output of the generator 176 remains constant for a short interval of time but is returned to zero or ground level before initiating the next sequence of pulses. The rate at which the signal increases is set to correspond to the round-trip velocity of the ultrasonic energy through the water. It will thus be seen the maximum or peak amplitude of the saw-tooth wave from the generator 176 corresponds to the length of the water path between the search unit 160 and the tube 12.

For some purposes velocity of ultrasonic energy through water may be considered as constant. However, actually it does vary to some degree with such factors as the temperature of the water, etc. If the thickness $D_2$ of the wall is small, particularly when compared to the length $D_1$ of the water-coupling path and a high degree of precision is desired, it is desirable to compensate for any changes in water temperature.

In the present instance this is accomplished by a search unit 176 being mounted on the plate a predetermined fixed distance from a reflector 178. The search unit 176 is coupled to a transmitter-receiver 180 triggered by the pulser 170. This transmitter-receiver 180 is effective to produce a signal having an amplitude which is a function of the distance between the search unit 176 and the reflector 180. It will be seen that as the water temperature and therefore the velocity varies the amplitude of the output signal varies in a similar manner. In other words, the variations in the signal are a function of the water temperature.

This compensating signal is in turn applied to a control input 182 on the ramp generator 176. The amplitude of this signal is effective to vary the rate of increase of the saw-tooth signal as a function of the water temperature whereby the rate of increase of the sawtooth wave is a function of the velocity and independent of the water temperature.

The output of the second receiver 174 is coupled to a second ramp generator 184. This ramp generator 184 is similar to the first generator 176. However, it is triggered by the second or interface pulse and turned off by the third pulse. Thus the peak amplitude of this sawtooth signal corresponds to the thickness of the tubing wall.

It should be noted that the velocity of sound through the metal in the wall of the tube 12 is substantially constant. At least this is true within an acceptable degree of accuracy over the distances corresponding to the wall thickness. Therefore, the rate at which the sawtooth wave from the ramp generator 184 rises may be set at the appropriate amount for the material in the tube. No compensation is required for the temperature variations. It will thus be seen the peak amplitude of the signal from ramp generator 184 will be a function of the thickness of the wall of the tube 12.

The second search unit 162 is also connected to a second pair of channels 186 and 188 similar to the first pair of channels 164 and 166. This pair of channels 186 and 188 includes a transmitter 190 for driving the search unit 162 and two receivers 192 and 194 for receiving the signals from the search unit 162.

The transmitter 190 is coupled to the pulser 170 whereby it transmits the pulse of ultrasonic energy in synchronism with the first transmitter 168. The transmitters may be of the free-running variety and operate independently of each other. However, it has been found desirable to drive all of the transmitters 168, 180 and 190 from the single pulser 170 whereby they all transmit and receive substantially simultaneously. This insures that all of the measurements to be compared are made at the same point on the tube 12.

The pair of ramp generators 196 and 198 is coupled to the second pair of receivers 192 and 194. These correspond to the first pair of ramp generators 176 and 184 and produce signals corresponding respectively to length $D_5$ of the water path and to the thickness $D_2$ of the wall of the tube 12.

The outputs from all four of the ramp generators 176, 184, 196 and 198 are coupled to a computer 200 or similar device for utilizing the distance signals. The computer 200 is programmed to utilize the distance signals $D_1$, $D_2$, $D_4$ and $D_5$ so as to provide output signals to correspond to those particular factors which are of interest.

For example, the present computer 200 is effective to produce an alarm or indicating signal whenever one of the signals $D_2$ or $D_3$ from the two ramp generators 184 or 196 are less than some predetermined amount. Such a signal indicates one of the walls is too thin.

The computer 200 is also effective to add all four of the signals $D_1$, $D_2$, $D_4$ and $D_5$ from the ramp generators 176, 184, 196 and 198 and produce a signal corresponding to the sum thereof. The summation signals are then subtracted from a signal corresponding to the constant, predetermined distance C between the two search units 160 and 162. The resultant difference signal corresponds to the inside diameter $D_3$ of the tube 12.

It will thus be seen that all of the search units in each of the inspection stations simultaneously scan the tube 12 along a helical scan path as it is rotated and advanced axially through the system. Since there is a large number of search units in each inspection station, the pitch of the individual spiral paths may be increased to correspond to the large number of search units.

Since all of the various individual scan paths are interlaced with the other scan paths in that inspection station, a full and complete inspection of all of the material in the wall of the tube is effectively insured. Since all of the search units in an inspection station are disposed in a common plane, whenever there is an adjustment of the search units in an inspection station all of the beams will still be incident upon the tube in a common plane. Thus, a proper interrelation and interlacing of the scan paths will always be preserved irrespective of the adjustment of the various search units.

The outputs from each of the modules are interconnected with suitable alarms, etc., to alert the operator whenever a defect is detected. Also, they are interconnected with a recorder 202 whereby a permanent record is made for each individual tube inspected.

We claim:

1. The combination of
   a tube transport line for moving a tube axially,
   a drive station for simultaneously moving said tube axially along said line and rotating said tube about its axis,
   an inspection station positioned on said line, said inspection station including a pair of search units positioned on diametrically opposite sides of said tube, said search units being spaced a predetermined distance from each other and said tube,
   receiving means coupled to the search units to produce at least one signal corresponding to a dimension of said tube,
   means in said receiving means for producing signals corresponding to the distances between the search units and the adjacent sides of the tube and signals corresponding to the thicknesses of said sides of the tube, and
   means in said receiving means for producing an inside diameter signal corresponding to the difference between the sum of said signals and a signal corresponding to the distance between said search units.

2. The combination of
   a transport line for carrying an axially elongated workpiece axially therealong,
   drive means for simultaneously rotating and axially advancing said workpiece in said transport line,
   a first inspection station on said transport line,
   a group of ultrasonic search units in said first inspection station, each of said search units being adapted to transmit and receive ultrasonic energy along a beam having a predetermined width,
   positioning means in said first inspection station for positioning all of the search units in said group with their beams incident upon the workpiece in a common plane and at uniformly circumferentially spaced intervals therearound whereby all of the beams in the group scan the workpiece along equally spaced interlaced helical paths and propagate longitudinally through the workpiece in a forward direction,
   a second inspection station on said transport line and separated from the first inspection station,
   a group of ultrasonic search units in said second inspection station, each of said search units in said second group being adapted to transmit and receive ultrasonic energy along a beam having a predetermined width,
   positioning means in said second group for positioning all of the search units in said second group with their beams incident upon the workpiece in a second common plane and at uniformly circumferentially spaced intervals therearound whereby the beams in the second group scan the workpiece along equally spaced interlaced helical paths and propagate longitudinally through the workpiece in a rearward direction,
   a third inspection station on said transport line and separated from the other inspection stations,
   a group of ultrasonic search units in said second inspection station, each of said search units in said third group being adapted to transmit and receive ultrasonic energy along a beam having a predetermined width,
   positioning means in said third inspection station for positioning all of the search units in said third group with their beams incident upon the workpiece in a common plane and at uniformly circumferentially spaced intervals therearound whereby the beams in the third group scan the workpiece along equally spaced interlaced helical paths and propagate circumferentially around the workpiece in a right hand direction,
   a fourth inspection station on said transport line and separated from the other inspection stations,
   a group of ultrasonic search units in said fourth inspection station, each of said search units in said fourth group being adapted to transmit and receive ultrasonic energy along a beam having a predetermined width, and
   positioning means in said fourth inspection station for positioning all of the search units in said fourth group with their beams incident upon the workpiece in a common plane and at uniformly circumferentially spaced intervals therearound whereby the beams in the fourth group scan the workpiece along equally spaced interlaced helical paths and propagate circumferentially around the workpiece in a left hand direction.

3. The combination of:
   a transport line for carrying an axially elongated workpiece axially therealong;
   drive means for simultaneously rotating and axially advancing said workpiece in said transport line;

at least first and second inspection stations on said transport line;

a plurality of ultrasonic search units mounted at said first inspection station, each of said search units being adapted to transmit and receive ultrasonic energy along a beam having a predetermined width;

positioning means at said first inspection station for positioning all of said plurality of search units thereat to direct their respective ultrasonic beams so as to be incident upon said workpiece at uniformly circumferentially spaced intervals defining a common plane transverse to the axis of said workpiece and obliquely inclined relative to said axis to cause said plurality of beams to scan said workpiece along equally spaced interlaced helical paths which after entering said workpiece at said common plane propagate longitudinally along said workpiece for greatest sensitivity to workpiece defects oriented transversely to the workpiece axis;

another plurality of ultrasonic search units mounted at said second inspection station, each of said plurality of search units mounted at said second station being adapted to transmit and receive ultrasonic energy along a beam having a predetermined width; and positioning means at said second station for positioning all of the search units mounted thereat to direct their respective ultrasonic beams so as to be incident upon said workpiece at uniformly circumferentially spaced locations therearound defining a common plane transverse to the workpiece axis, said positioning means at said second inspection station further positioning all of said search units thereat to direct the respective ultrasonic beams along directions laterally offset from an intersection with the axis of said workpiece but transverse thereto such that the beams from said search units at said second inspection station scan said workpiece along equally spaced interlaced helical paths which propagate circumferentially around said workpiece for greatest sensitivity to workpiece defects oriented longitudinally thereof.

* * * * *